(12) United States Patent
Jang et al.

(10) Patent No.: US 8,111,346 B2
(45) Date of Patent: Feb. 7, 2012

(54) LIQUID CRYSTAL DISPLAY WITH PROTRUDING SUPPORTS AND MANUFACTURING METHOD THEREOF

(75) Inventors: Jinseok Jang, Yongin-si (KR); Younbum Lee, Yongin-si (KR); Yeonshil Jung, Yongin-si (KR)

(73) Assignee: Samsung Mobile Display Co., Ltd., Yongin (KR)

( * ) Notice: Subject to any disclaimer, the term of this patent is extended or adjusted under 35 U.S.C. 154(b) by 757 days.

(21) Appl. No.: 12/121,675

(22) Filed: May 15, 2008

(65) Prior Publication Data

US 2008/0284937 A1    Nov. 20, 2008

(30) Foreign Application Priority Data

May 16, 2007    (KR) .................. 10-2007-0047827

(51) Int. Cl.
*G02F 1/1333* (2006.01)
*G02F 1/1335* (2006.01)
*F21V 5/00* (2006.01)

(52) U.S. Cl. ............... 349/58; 349/61; 349/62; 349/63; 349/64; 349/65; 362/559; 362/561

(58) Field of Classification Search .............. 349/58, 349/61–72, 149–152; 362/632–634, 659, 362/561
See application file for complete search history.

(56) References Cited

U.S. PATENT DOCUMENTS

| | | | | |
|---|---|---|---|---|
| 6,295,103 | B1 * | 9/2001 | Yamatani et al. | 349/58 |
| 6,504,586 | B1 * | 1/2003 | Lee | 349/58 |
| 6,552,761 | B1 * | 4/2003 | Seo et al. | 349/58 |
| 2006/0244891 | A1 * | 11/2006 | Tsubokura et al. | 349/150 |

FOREIGN PATENT DOCUMENTS

| KR | 10-2004-0061119 | 7/2004 |
|---|---|---|
| KR | 10-2004-0072798 | 8/2004 |
| KR | 10-2006-0022137 | 3/2006 |

* cited by examiner

*Primary Examiner* — Hoan C Nguyen
(74) *Attorney, Agent, or Firm* — Christie, Parker & Hale, LLP

(57) ABSTRACT

A liquid crystal display has a frame including a base and a reinforced portion extending from the base, the reinforced portion defining a partial edge of the frame. The liquid crystal display further includes an optical sheet on the base, the optical sheet including a backlight unit, a flexible printed circuit on the optical sheet, and a liquid crystal display panel comprising a large scale integrated circuit, the liquid crystal display panel substantially covering the optical sheet. A window is attached to and substantially covers the frame at least one support extends from the base for supporting the window and/or the backlight unit.

24 Claims, 14 Drawing Sheets

*PRIOR ART*

LIQUID CRYSTAL DISPLAY WITH PROTRUDING SUPPORTS AND MANUFACTURING METHOD THEREOF

CROSS-REFERENCE TO RELATED APPLICATION

This application claims priority to and the benefit of Korean Patent Application No. 10-2007-0047827, filed on May 16, 2007, the entire content of which is incorporated herein by reference.

BACKGROUND OF THE INVENTION

1. Field of the Invention

The present relates to a liquid crystal display and a manufacturing method thereof, more particularly to a support structure for the liquid crystal display.

2. Description of the Related Art

Referring to FIG. 1, a conventional liquid crystal display typically includes a generally rectangular frame 20 supporting a liquid crystal display (LCD) panel 10. As illustrated in FIG. 1, a reinforced frame portion 21 is on three sides of the frame 20, and an unreinforced frame portion 22, thinner than the reinforced frame, extends along one side of the frame 20 to accommodate a flexible printed circuit 30 coupled to the LCD panel 10, the flexible printed circuit adapted to be coupled to an external printed circuit board (PCB).

In a conventional LCD, a window 11 is located above a surface of the frame 20 to which the flexible printed circuit 30 is attached. Since the frame 20 has an unreinforced frame portion 22, external impact or applying force to the window may result in a lower substrate 12 of the LCD panel 10 or a large scale integrated circuit (LSI) 13 on the lower substrate 12 being damaged.

SUMMARY

Aspects of the present invention provide a liquid crystal display and a manufacturing method thereof for preventing a panel or an LSI from being damaged by an external impact or pressure of a window due to at least one support supporting a backlight unit (BLU) and/or the window.

In one embodiment, a liquid crystal display has a frame including a base and a reinforced portion extending from the base, the reinforced portion defining a partial edge of the frame. The liquid crystal display further includes an optical sheet on the base, the optical sheet including a backlight unit, a flexible printed circuit on the optical sheet, and a liquid crystal display panel comprising a large scale integrated circuit, the liquid crystal display panel substantially covering the optical sheet. A window is attached to and substantially covers the frame at least one support extends from the base for supporting the window and/or the backlight unit.

In one embodiment, the at least one support is a pillar having any one cross-sectional shape selected from a circle, a triangle, and a rectangle. Further, the at least one support protrudes into a space between the large scale integrated circuit and the window to protect the large scale integrated circuit and/or the liquid crystal display panel from an external impact or pressure. The flexible printed circuit may include at least one through hole through which the at least one support protrudes. Further, a height of the at least one support may be about equal to a thickness of the reinforced portion.

Also provided is a method for manufacturing a liquid crystal display including providing a frame having at least one support extending from the frame in a thickness direction, forming a base layer of a panel by placing an optical sheet on the frame, placing a flexible printed circuit on one side of the optical sheet, placing a liquid crystal display panel on the optical sheet, the liquid crystal display panel including a large scale integrated circuit, and placing a window or a backlight unit onto the frame such that the at least one support provides support to the window or backlight unit.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION

Figure 1:
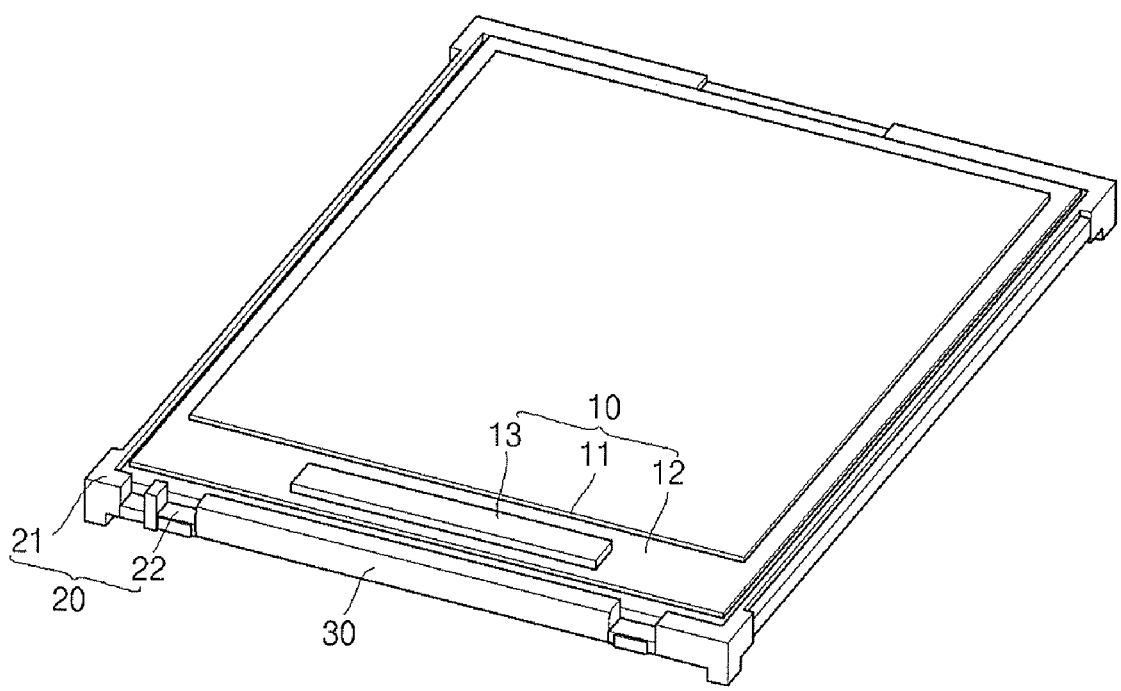
FIG. 1 illustrates a general liquid crystal display.

In the following detailed description, only certain exemplary embodiments of the present invention are shown and described, by way of illustration. As those skilled in the art would recognize, the invention may be embodied in many different forms and should not be construed as being limited to the embodiments set forth herein. Like reference numerals designate like elements throughout the specification.

Figure 2A:
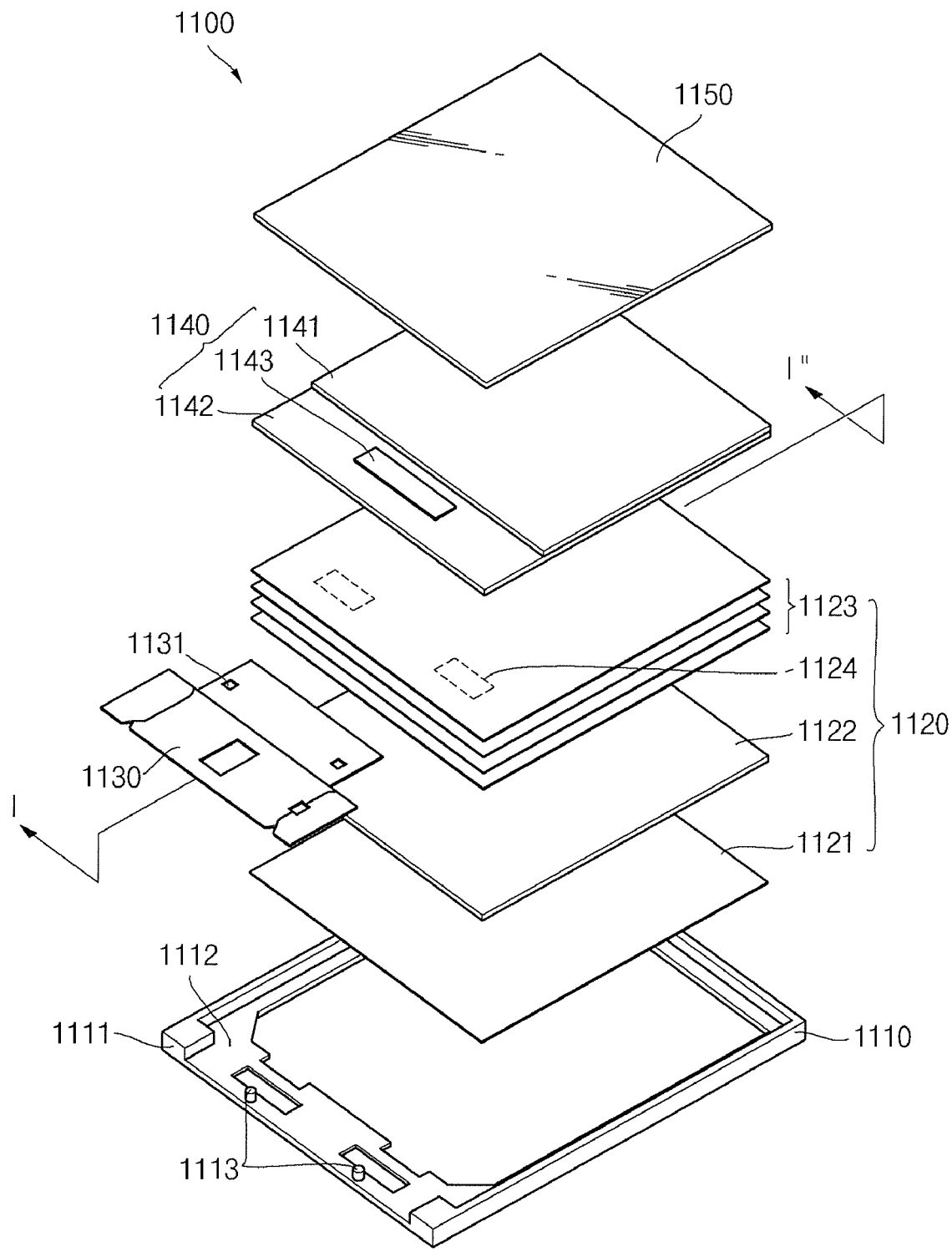
FIG. 2A is an exploded perspective view illustrating a liquid crystal display according an exemplary embodiment of the present invention.
Figure 2B:
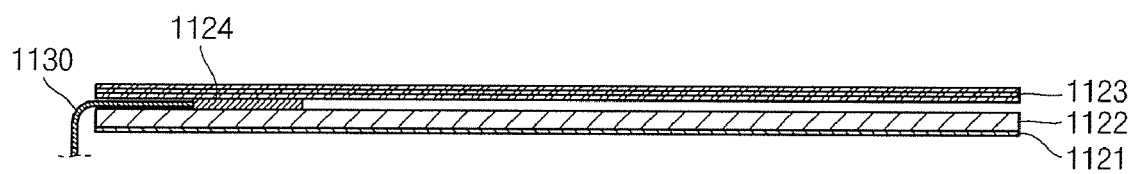
FIG. 2B is a cross-sectional view of FIG. 2A taken along the line 1-1".

With reference now to FIG. 2, the liquid crystal display 1100 according to an embodiment of the present invention includes a frame 1110, a base layer 1120 of a panel, a flexible printed circuit 1130, a LCD panel 1140 and a window 1150.

The frame 1110 is a basic frame for a liquid crystal display, and as illustrated in FIG. 2, the frame 1110 includes a reinforced portion 1111, a base 1112, and a support 1113.

The reinforced portion 1111 has a constant thickness and partially extends along an edge of the frame 1110. In one embodiment, the reinforced portion 1111 supports the window 1150 and the LCD panel 1140. Due to the constant thickness of the reinforced portion 1111, impact transferred to the frame 1110 is minimized by being dispersed throughout the window 1150.

The base 1112 extends between a portion of the frame 1110 absent the reinforced portion 1111, the base adapted to accommodate the flexible printed circuit 1130. The flexible printed circuit 1130 is required for coupling the LCD panel 1140 to a BLU and for coupling the LCD panel 1140 to an external printed circuit board (PCB).

The support 1113 is located in the base 1112, protrudes from the base to about a height of the reinforced portion 1111. Referring to FIG. 2, the support 1113 includes two protrusions in the base 1112, and in one embodiment the protrusions are cylindrical.

The support 1113 is between the window 1150 and the base 1112 of the frame 1110 and supports the window 1150. A lower substrate 1142 and an LSI 1143 of the LCD panel 1140 are located between the window 1150 and the base 1112.

In a conventional liquid crystal display device, if an external impact or pressure is applied to a top surface of the base 1112, the LCD panel 1140 or LSI 1143 could be easily cracked.

However, since a liquid crystal display 1100 according an exemplary embodiment of the present invention includes the support 1113, the likelihood of an external impact causing a crack in the LCD panel 1140 or in the LSI 1143 can be reduced or prevented. To be more specific, the support 1113 protrudes from the base 1112 such that its height is about equal to a height of the reinforced portion 1111. Therefore, when the window 1150 is on the frame 1110, the window 1150 contacts the reinforced portion 1111 and the support 1113 of the frame 1110. Consequently, when an external impact or pressure is applied to the base 1112 via the window 1150, the reinforced portion 1111 and the support 1113 disperse the impact throughout the frame 1110 with the support being able to withstand the external impact. Consequently, the lower substrate 1142 and the LSI 1143 of the LCD panel 1140 between the window 1150 and the base 1112 may be protected from external impact or pressure. Therefore, a LCD panel or a LSI may be prevented from being damaged.

A liquid crystal display 1100 according embodiments of the present invention may prevent a LCD panel or an LSI from being damaged by an external impact or pressure due to the support 1113 in the base 1112 of the frame 1110. The base layer 1120 of a panel is located within the frame 1110. As illustrated in FIG. 2, the base layer 1120 of a panel may include a reflection plate 1121, a light guiding plate 1122, an optical sheet 1123, and a BLU 1124.

The reflection plate 1121 contacts the base 1112 and reflects light from the BLU 1124 and enables the reflected light to be incident on the LCD panel 1140. The reflection plate 1121 is primarily composed of a polyester (PET) material, and reflects light to reduce the loss of light incident on the light guiding plate 1122.

The light guide plate 1122 is on top of the reflection plate 1121 and is composed primarily of acryl poly(methyl methacrylate) (PMMA). A pattern constituted by guiding the incident light source uniformly distributes the light. The light guide plate 1122 may be manufactured by injection molding or by casting.

The optical sheet 1123 is on top of the light guiding plate 1122, and may include two diffusion sheets and two prism sheets between the two diffusion sheets. The diffusion sheet is primarily manufactured by using acrylic based resin on the substrate of polyester PET and being formed into a spherical shape for uniformly distributing the light emitted from the light guide plate 1122 and simultaneously condensing the light. The diffusion sheet primarily serves to protect the prism sheet, and the diffusion sheet may also be referred to as a protective film. The prism sheet is primarily composed of an acrylic based resin on the substrate of polyester PET and condenses light by being formed into a regular prism shape.

The BLU 1124 is a light source that receives a high voltage from an inverter and then generates a visible ray. A Cold Cathode Fluorescent Lamp (CCFL) is typically used as the BLU.

As illustrated in FIG. 2, the flexible printed circuit 1130 is on a top surface of the base layer 1120 of a panel, and more specifically on a front surface of the optical sheet 1123 in the base layer 1120. The flexible printed circuit 1130 electrically couples the BLU 1124 to the LSI 1143, and the LSI 1143 to an external PCB.

Through holes 1131 in the flexible printed circuit are located corresponding to the support 1113 through which the support 1113 protrudes to allow the flexible printed circuit 1130 to be easily coupled to the support and fixed thereto.

Generally, the LCD panel 1140 includes an upper substrate 1141 on which a color filter and a black matrix are formed; a lower substrate 1142 on which a thin-film transistor is formed; and a liquid crystal injected between the upper substrate 1141 and the lower substrate 1142. The LSI 1143 may be located on a top surface of the upper substrate 1141.

The LSI 1143 drives the BLU 1124 and the LCD panel 1140, and is electrically coupled to the BLU 1124 and to the external PCB via the flexible printed circuit 1130. Since the LSI 1143 receives an electrical signal from the external PCB, the BLU 1124 emits light for displaying an image on the LCD panel 1140.

The LSI 1143 may be located in the space between the base 1112 and the window 1150, and more specifically, on the top surface of the lower substrate 1142.

The window 1150 is located on a top surface of the LCD panel 1140. The window 1150 protects internal circuitry of a product using a LCD panel according to the present invention. As illustrated above, the window 1150 is supported by the reinforced portion 1111 of the frame 1110 and the support 1113.

In many conventional LCD devices, there is no structure for supporting a space between the base 1112 and the window 1150. Therefore, when an external impact or pressure is applied to a portion of the window over the space, the LCD panel 1140 or the LSI 1143 could be easily damaged.

However, as illustrated above, in the liquid crystal display 1100 according to an exemplary embodiment of the present invention, the support 1113 is located between the base 1112 and the window 1150 to prevent the LCD panel 1140 and the LSI 1143 from being damaged by external impact or pressure.

Below, the structure of various frames 1110, 1210, 1310, 1410 for liquid crystal displays according to embodiments of the present invention will be explained with reference to FIGS. 3a-3d.

Figure 3A:
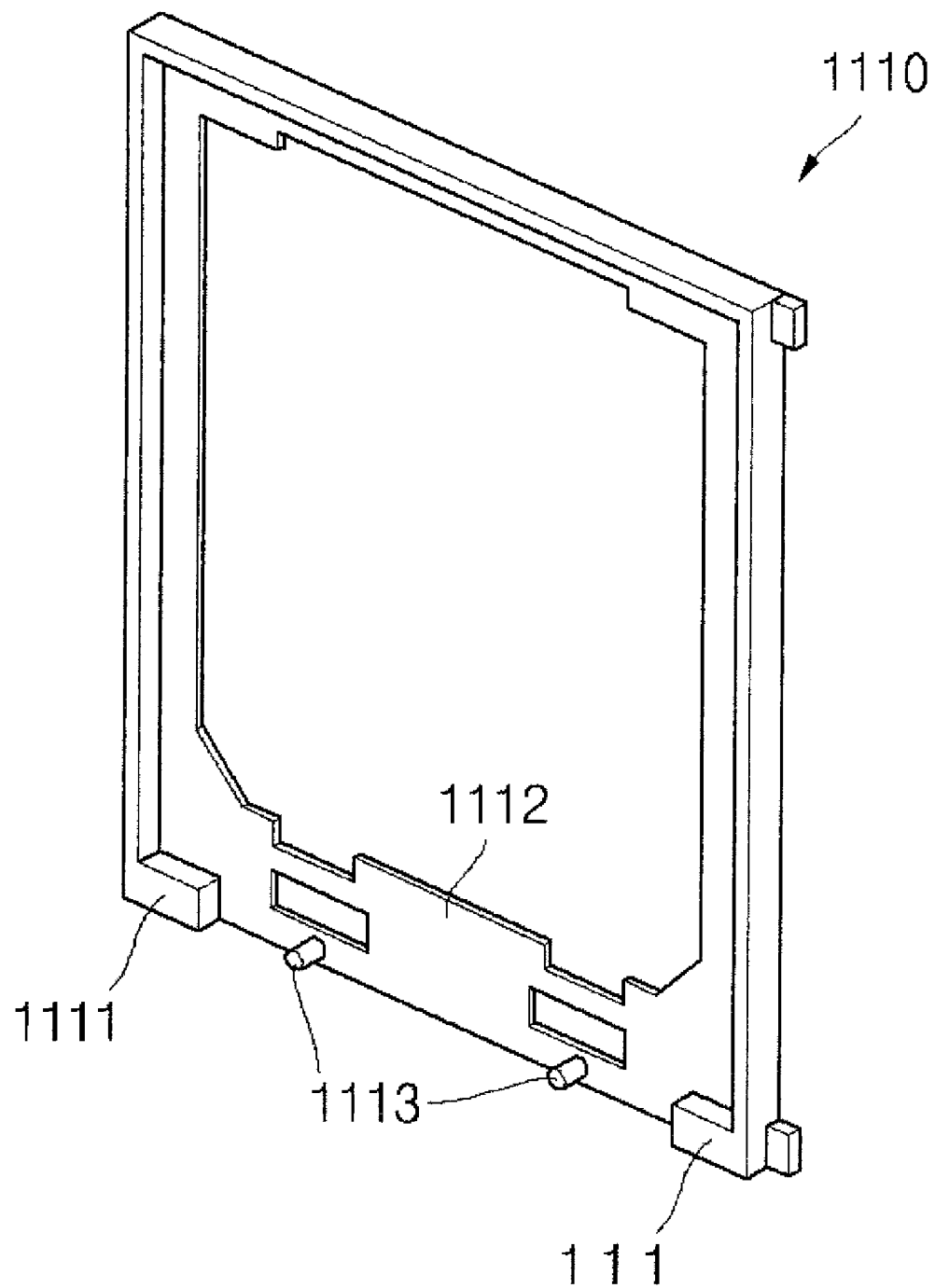
FIG. 3a to 3d are perspective views illustrating a mold structure of a liquid crystal display according an exemplary embodiment of the present invention.

With reference to FIG. 3a, the frame 1110 of the liquid crystal display 1100 according to an exemplary embodiment of the present invention includes the reinforced portion 1111, the base 1112, and two supports 1113 in a cylindrical pillar shape, as described above with reference to FIG. 2. Although the supports 1113 are shown spaced by a specific interval, one of ordinary skill in the art will appreciate that a space between the supports 1113 may vary without departing from the spirit and scope of the present invention.

Figure 3B:
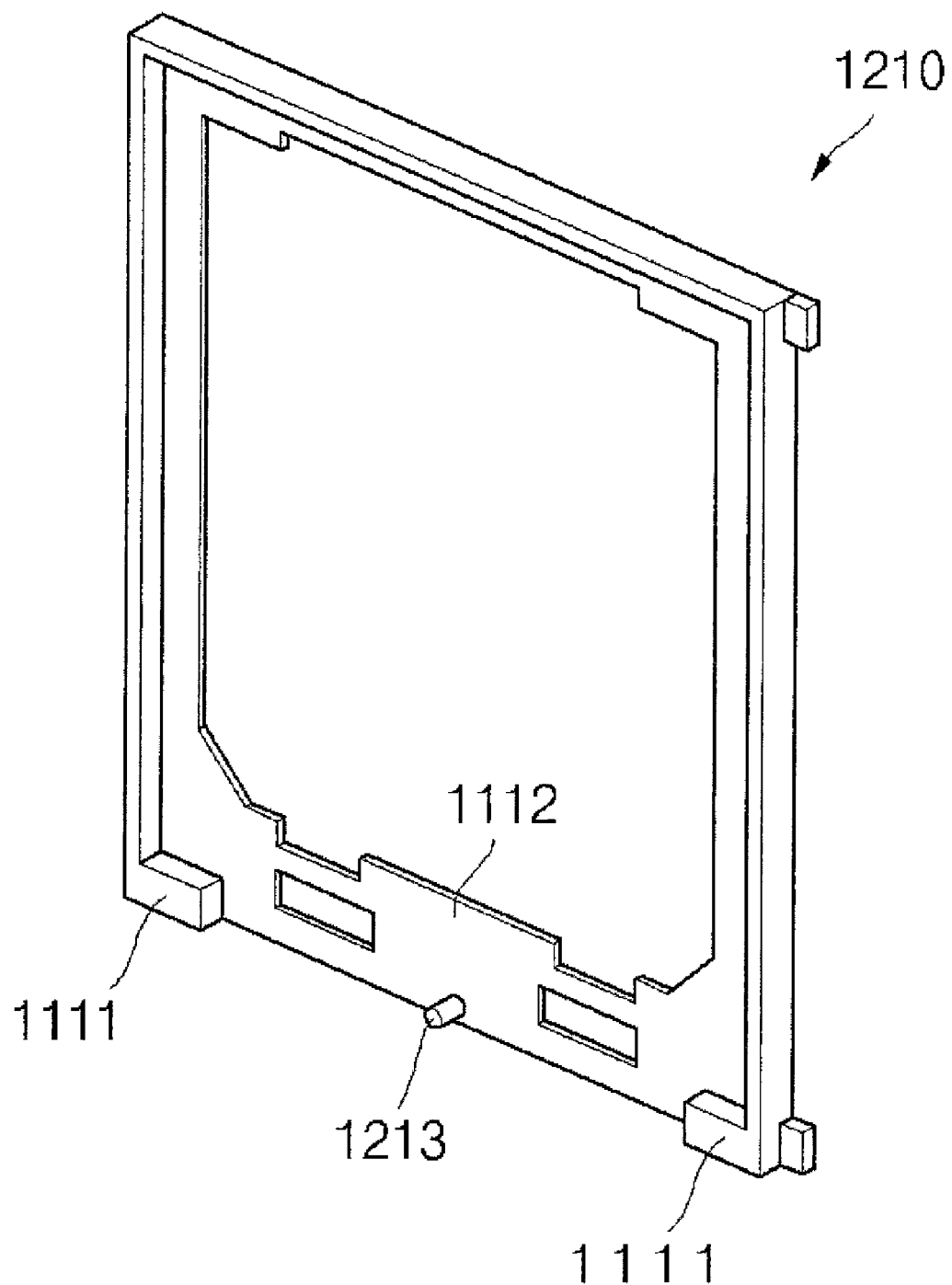

Referring to FIG. 3b, the structure of the frame 1210 according to another embodiment of the present invention is illustrated, the frame 1210 being substantially similar to the frame 1110 as described above. However, as illustrated in FIG. 3b, only a single support 1213 is provided in a cylindrical pillar shape. Although the support 1213 is in the middle of the base, the position is not limited thereto.

Figure 3C:
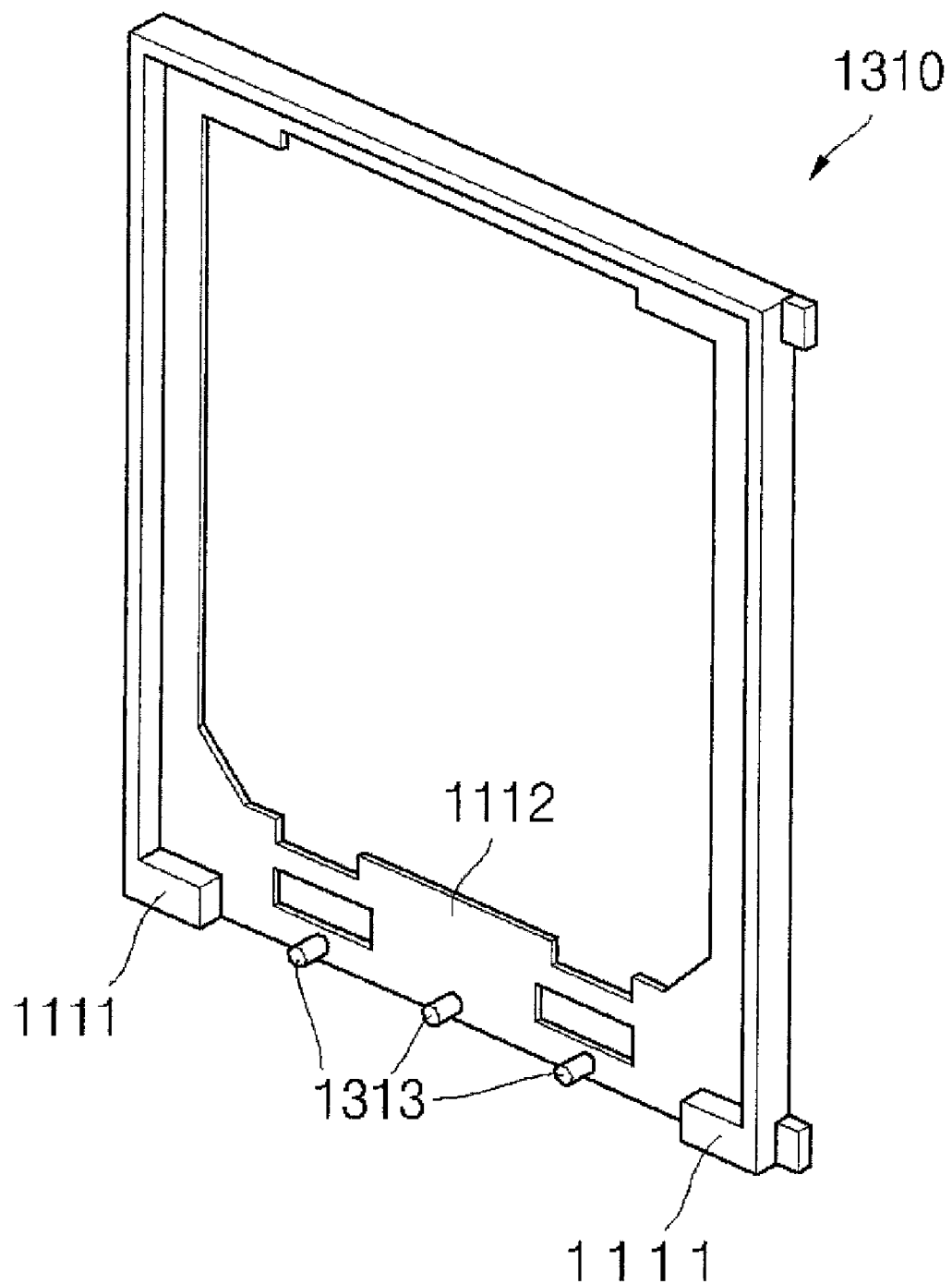

With reference now to FIG. 3c, the frame 1310 is substantially similar to the frame 1110, as described above. However, three supports 1313 are provided, evenly spaced along the base 1112. However, the specific position of the supports is not limited thereto.

Figure 3D:
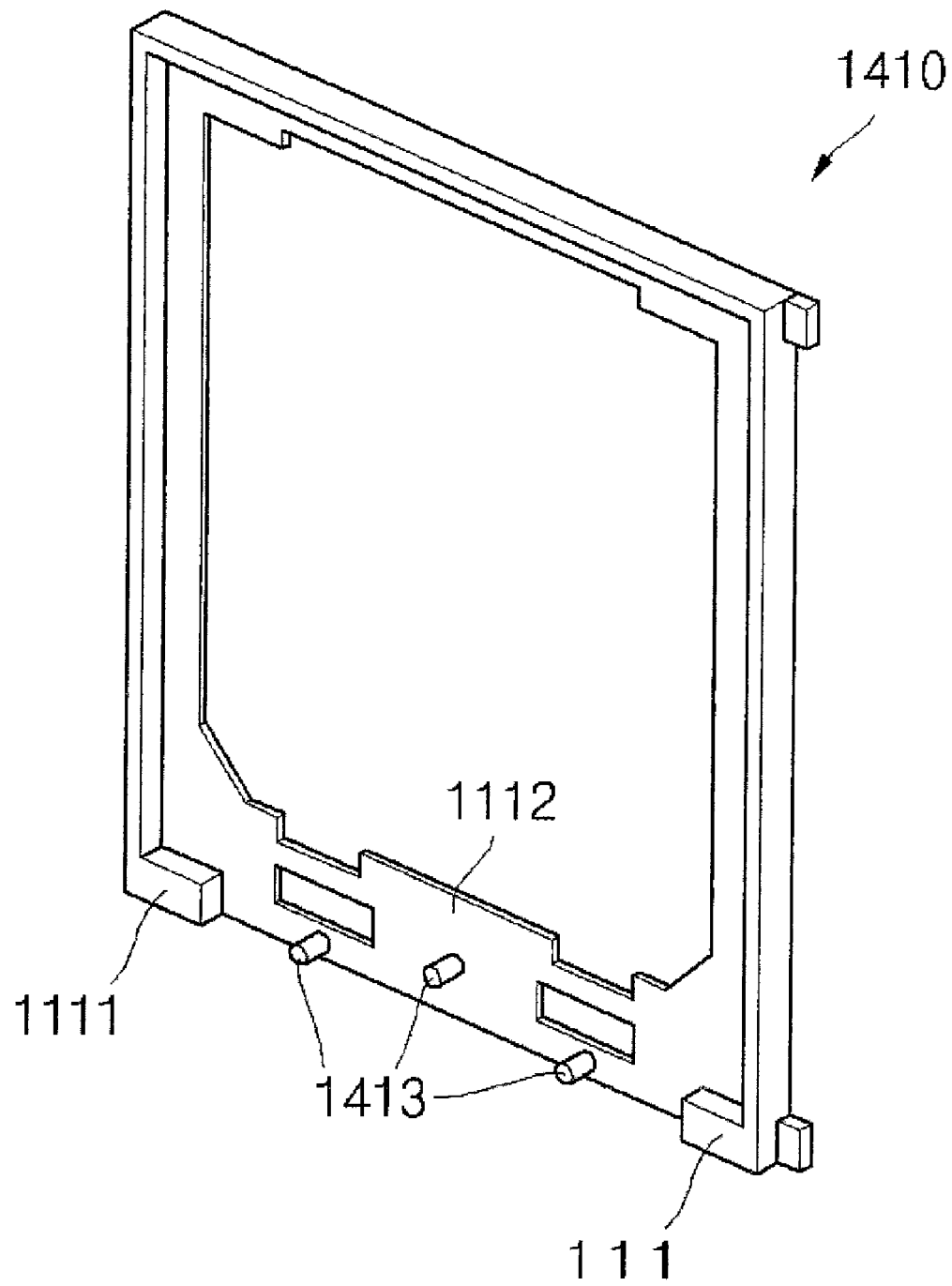

Similarly, with reference to FIG. 3d, the frame 1410 is substantially similar to the frame 1110, as described above. Three supports 1413 are provided, with at least one of the supports 1413 linearly offset from the other two. As such, since the supports 1413 are not in a straight line, the support for the window 1150 may be increased. As will be appreciated, the specific positioning of the supports 1413 is not limited to that shown in FIG. 3d.

Figure 4:
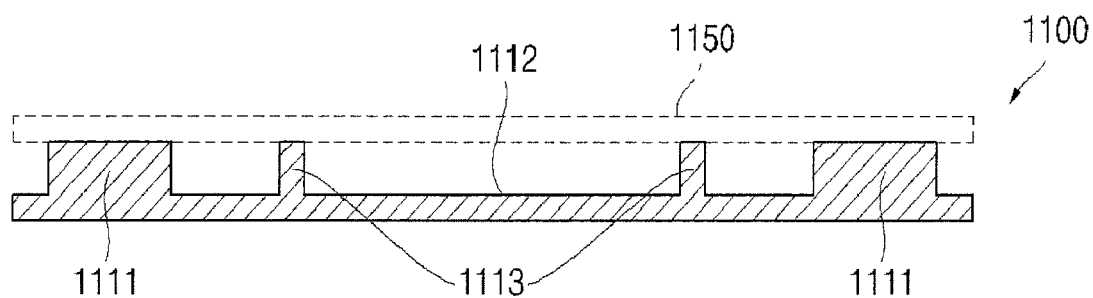
FIG. 4 is a front view illustrating a mold structure of a liquid crystal display according an exemplary embodiment of the present invention.

With reference now to FIG. 4, the window 1150 is shown supported by the reinforced portion 1111 and the supports 1113. As can be seen, a height of the supports 1113 is relatively equal to a thickness of the reinforced portion 1111.

Figure 5A:
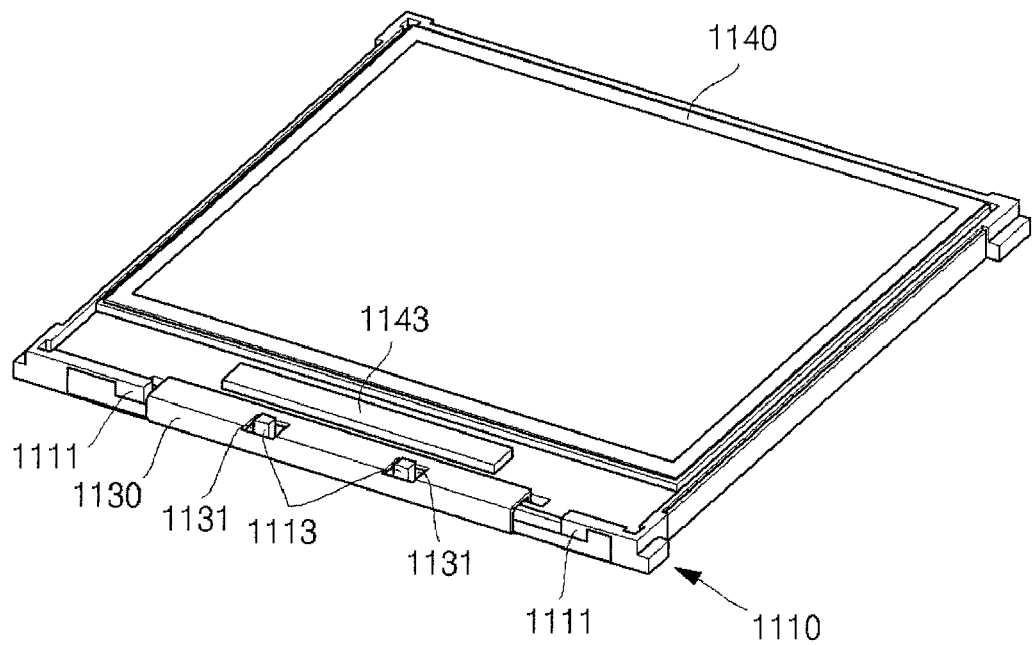
FIG. 5a and FIG. 5b are views illustrating a state which a window is formed on a panel and a mold of a liquid crystal display using a mold structure of a liquid crystal display according an exemplary embodiment of the present invention.

With reference now to FIG. 5a, the support 1113 includes two cylinders in the frame 1110 having the flexible printed circuit attached thereto. Further, the supports 1113 protrude through the through holes 1131 in the flexible printed circuit 1130 to allow the flexible printed circuit 1130 to electrically couple the BLU 1124 and the LSI 1143 via the through hole 1131.

Figure 5B:
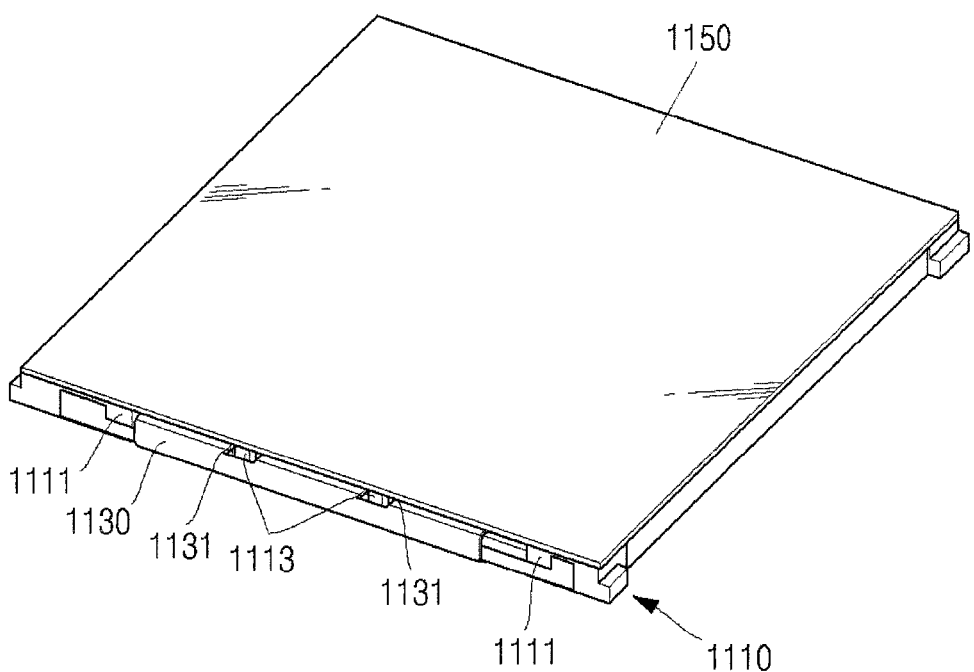

Referring to FIG. 5b, the window 1150 is formed on the upper side of the LCD panel 1140. The window 1150 is supported by the frame 1110, and more specifically, it is supported by the reinforced portion 1111 and the support 1113 of the frame 1110.

Figure 6A:
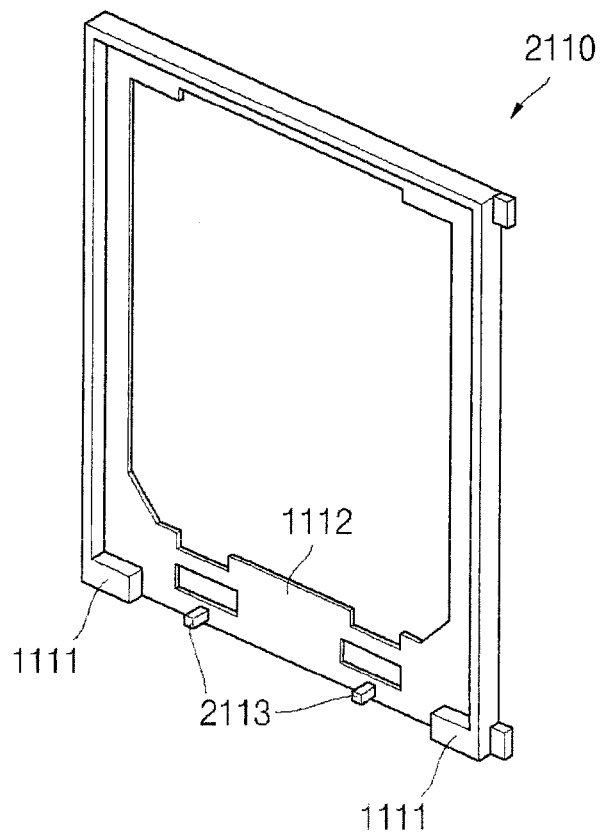
FIG. 6a to FIG. 6c are perspective views illustrating a mold structure of a liquid crystal display according another exemplary embodiment of the present invention.
Figure 6B:
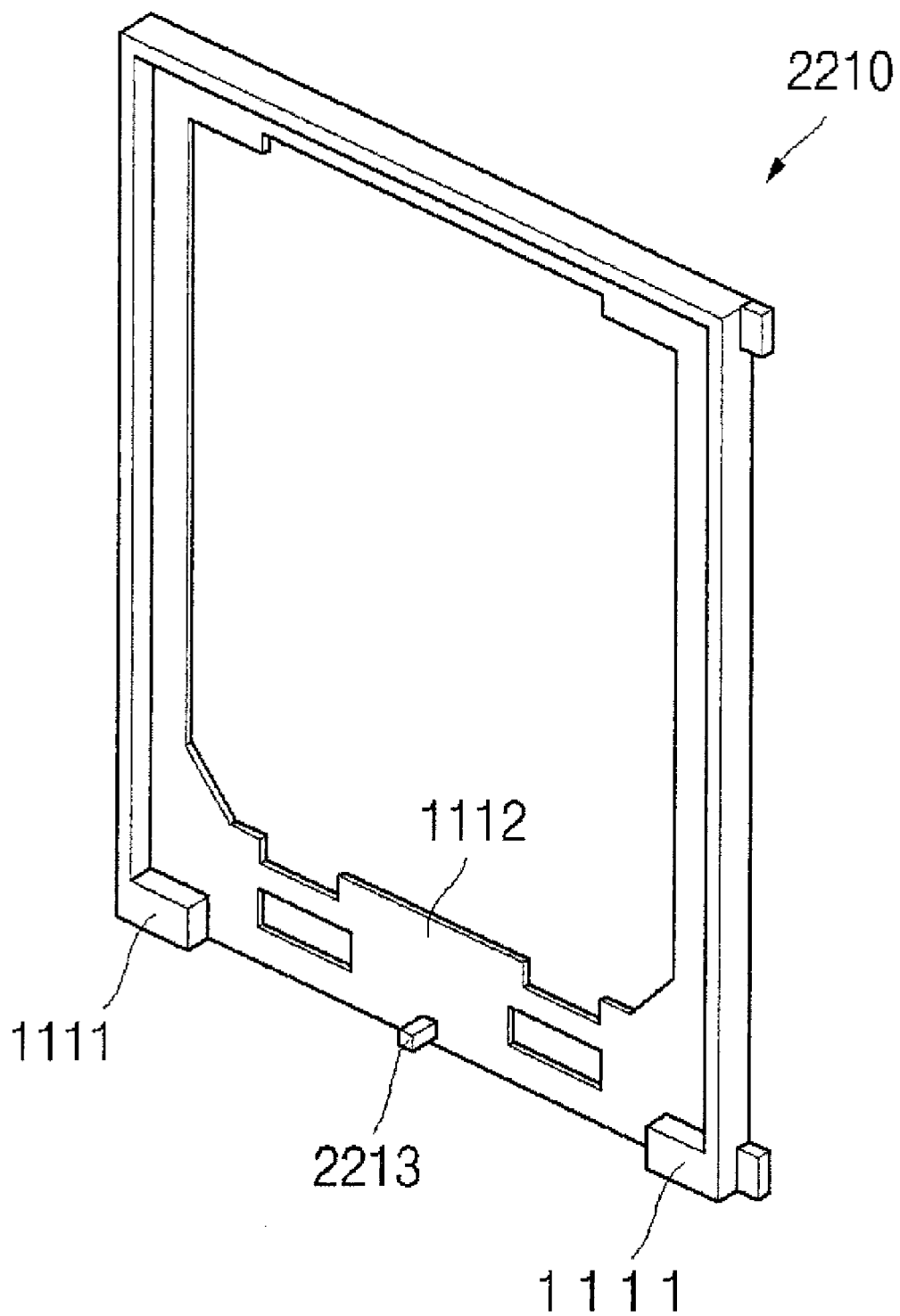
Figure 6C:
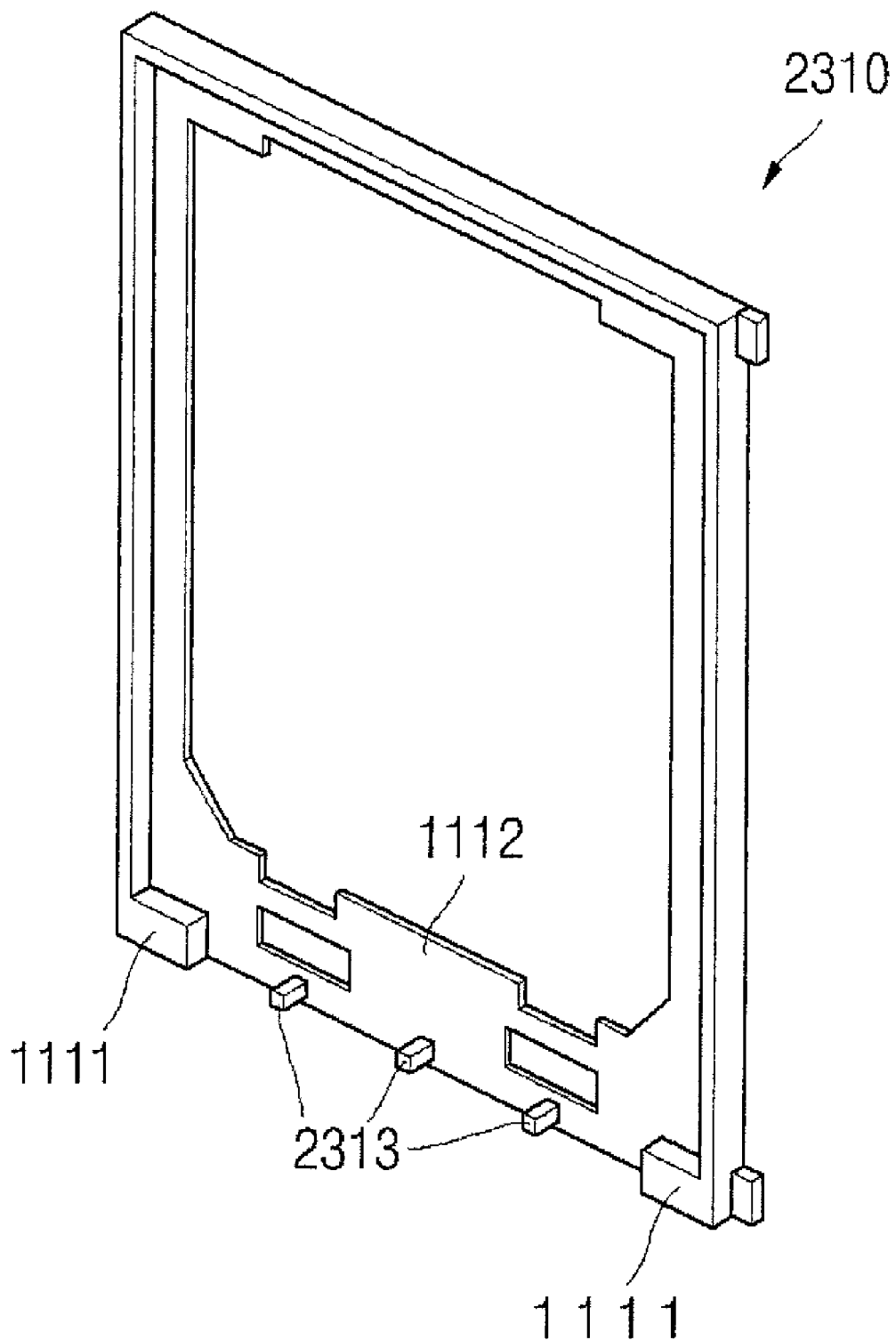

Referring now to FIGS. 6a-6c, various frames 2110, 2210, 2310 according to other embodiments of the present invention are provided. Similarly to the previously described frames, the frame 2110 includes the reinforced portion 1111, the base 1112, and a support formed on an upper surface of the base 1112.

Referring to FIG. 6a, a support 2113 includes two pillars having a rectangular cross-section spaced along the upper surface of the base 1112. A height of the support 2113 is about equal to the height of the reinforced portion 1111. As will be appreciated, the specific configuration of the support 2113 is not limited to that shown and described.

As shown in FIG. 6b, a support 2213 is provided including a single pillar having a rectangular cross-section on the upper surface of the base 1112 of frame 2210. Further, a support 2313 including three pillars having a rectangular cross-section is provided on the upper surface of the base 1112 of frame 2310.

Figure 7A:
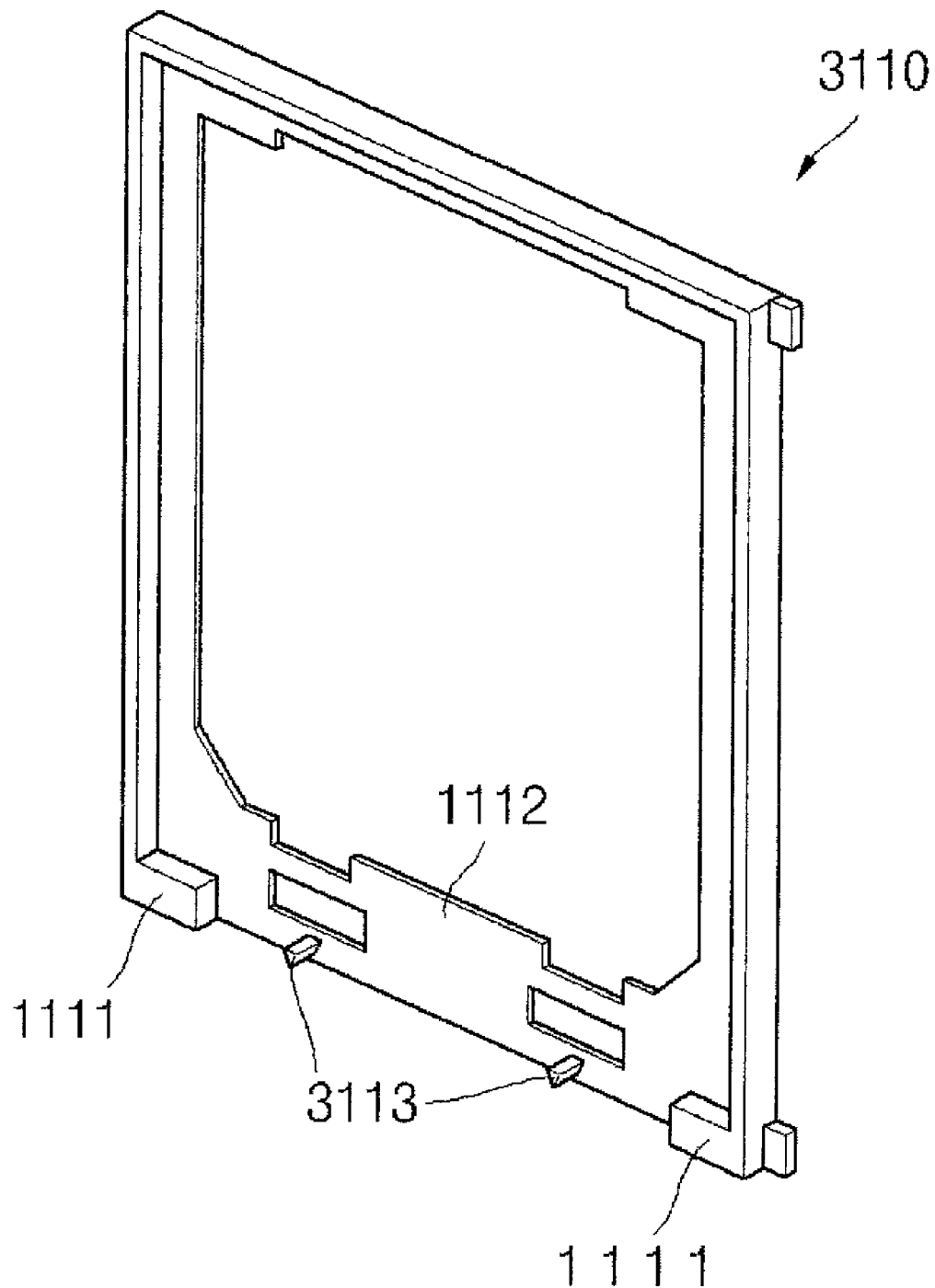
FIG. 7a to FIG. 7c are perspective views illustrating a mold structure of a liquid crystal display according another exemplary embodiment of the present invention.
Figure 7B:
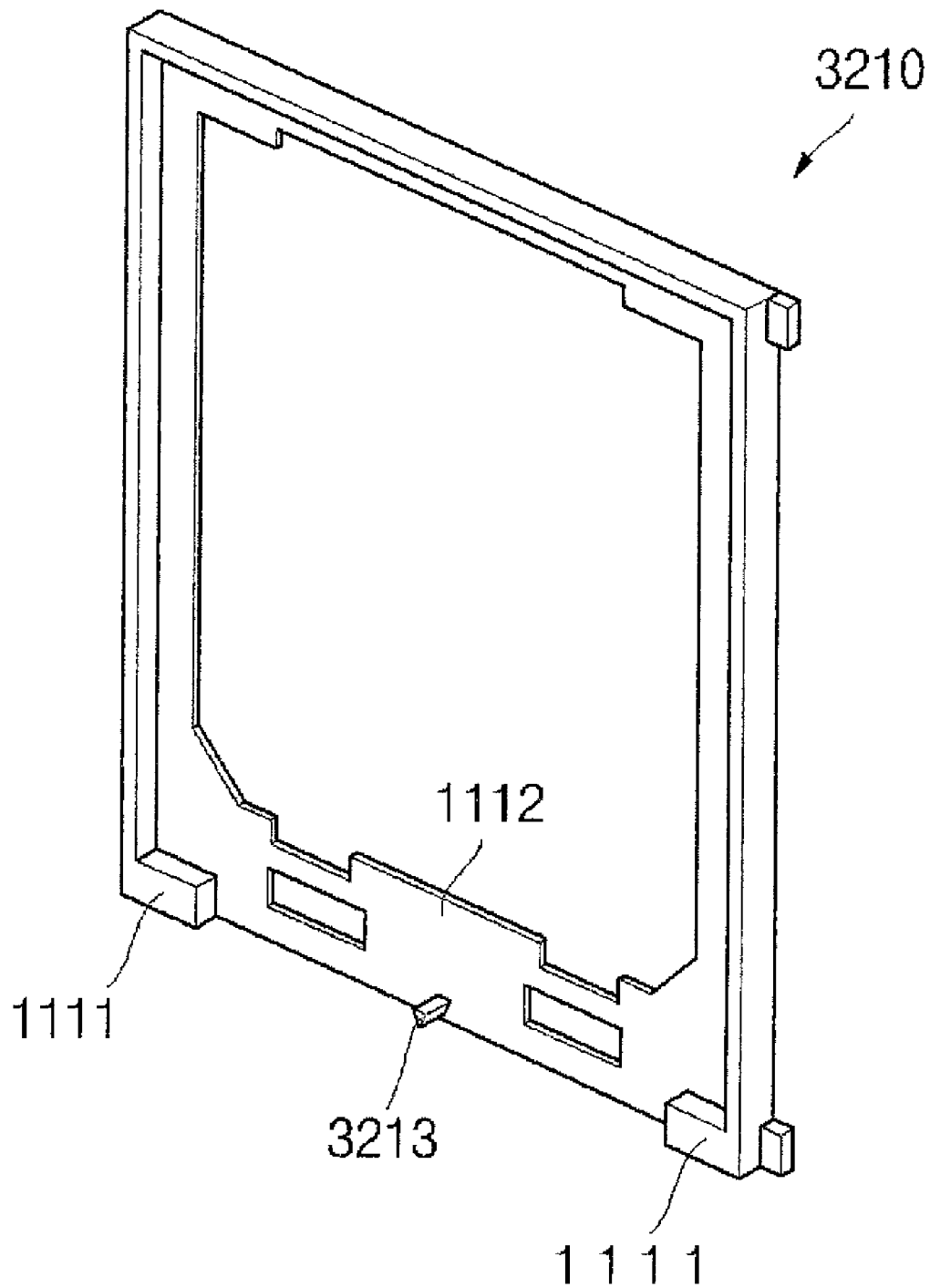
Figure 7C:
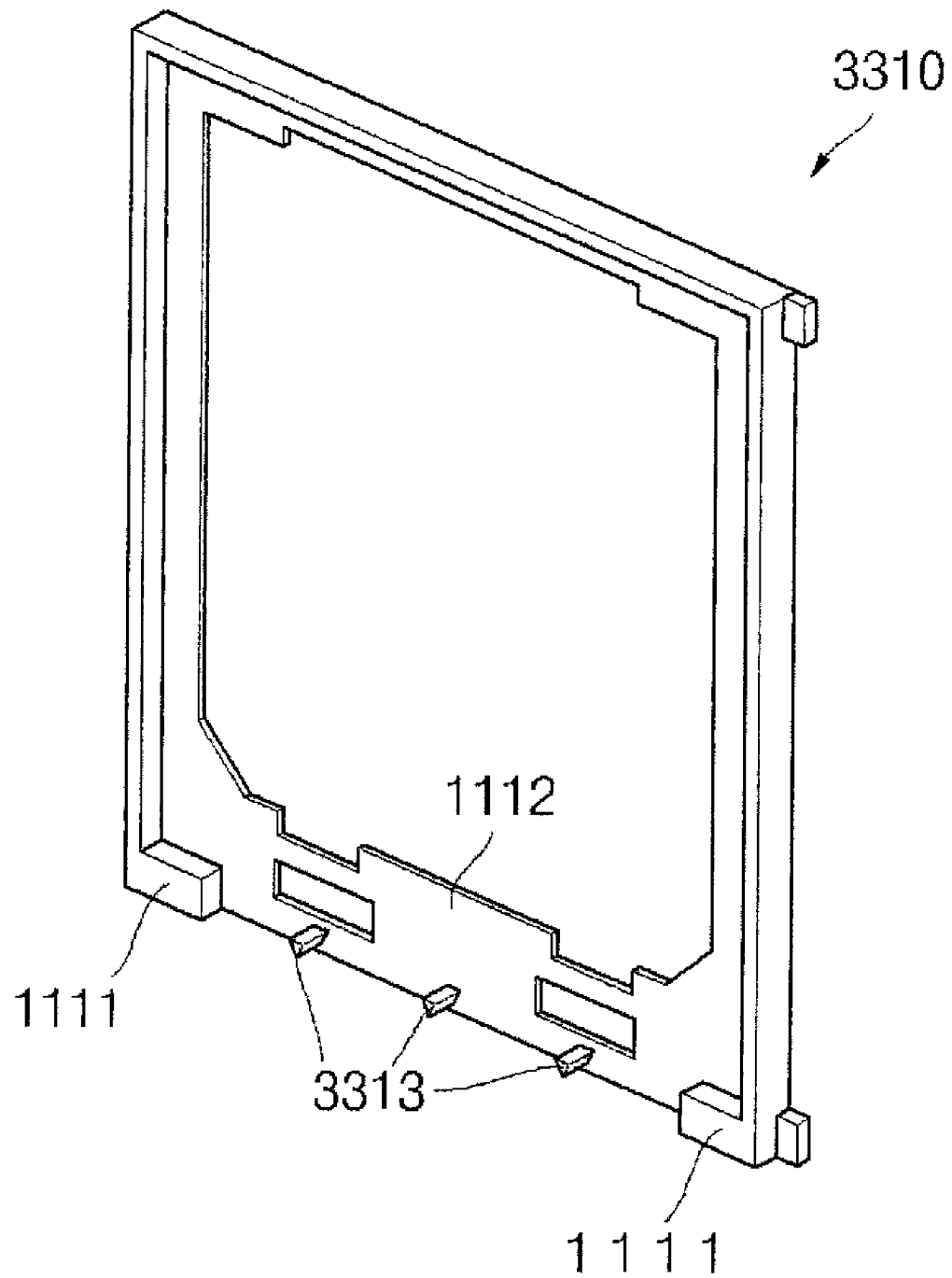

Similarly to the above described frames, FIGS. 7a, 7b, and 7c show additional embodiments of frames 3110, 3210, 3310 having two supports 3113, one support 3123, and three supports 3133, respectively, each support 3133, 3123, and 3133 having a triangular cross-section.

As will be appreciated by one of ordinary skill in the art, the particular shape and number of each support may vary, and the supports are not limited to the number and shapes described herein.

Below, a method for manufacturing the liquid crystal display 1100 according to an embodiment of the present invention will be explained. Referring to FIG. 2, a method for manufacturing a liquid crystal display 1100 includes steps of preparing a frame; providing a base layer of a panel; providing a flexible printed circuit; and providing an LCD panel.

The step of preparing a frame includes providing a frame 1110 that has the reinforced portion 1111, the base 1112 and the support 1113. Unlike a conventional frame, the frame 1110 includes the support 1113 on the upper surface of the base 1112.

The step of providing a base layer of a panel includes forming the base layer 1120 of a panel including a reflection plate 1121, a light guiding plate 1122, an optical sheet 1123, a BLU 1124, and the like on the upper surface of the frame 1110. The BLU 1124 may also be formed on the exterior surface of the frame and on the upper surface of the frame according to the desired configuration, and the present invention does not limit the position of the BLU 1124.

The step of providing a flexible printed circuit includes forming the flexible printed circuit 1130 on the optical sheet 1123 of the base layer 1120 of a panel. As illustrated above, through holes 1131 located corresponding to the support 1113 are provided in the flexible printed circuit 1130 through which the support 1113 protrudes.

The step of providing an LCD panel includes forming the LCD panel 1140 on the top surface of the base layer 1120 of a panel. The LCD panel 1140 includes an upper substrate 1141 on which a color filter and a black matrix are formed; a lower substrate 1142 on which a thin-film transistor is formed; and a liquid crystal injected between the upper substrate 1141 and the lower substrate 1142. As illustrated above, the LSI 1143 is located on a surface of the lower substrate 1142.

As illustrated above, a liquid crystal display and a manufacturing method thereof according to embodiments of the present invention may prevent a panel and/or an LSI from being damaged by external impact and/or pressure on the window 1150 due to at least one support supporting a BLU and the window.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof. For example, it will be appreciated that the supports may be one of a variety of different shapes, including hexagonal or octagonal, and that there may be more than three supports.

What is claimed is:

1. A liquid crystal display comprising:
    a frame comprising a base and a reinforced portion protruding around at least a portion of the base, such that a thickness of the frame is greater at the reinforced portion than at the base alone;
    an optical sheet on the base, the optical sheet including a backlight unit;
    a flexible printed circuit on the optical sheet;
    a liquid crystal display panel comprising a large scale integrated circuit, the liquid crystal display panel substantially covering the optical sheet;
    a window attached to and substantially covering the frame; and
    at least one support protruding from the base and contacting the window to provide support thereto.

2. The liquid crystal display as claimed in claim 1, wherein the at least one support is a pillar having any one cross-sectional shape selected from a circle, a triangle, and a rectangle.

3. The liquid crystal display as claimed in claim 1, wherein the at least one support protrudes into a space between the large scale integrated circuit and the window to protect the large scale integrated circuit from an external impact or pressure.

4. The liquid crystal display as claimed in claim 1, wherein the at least one support protrudes into a space between the large scale integrated circuit and the window to protect the liquid crystal display panel from an external impact or pressure.

5. The liquid crystal display as claimed in claim 1, wherein the flexible printed circuit comprises at least one through hole through which the at least one support protrudes.

6. The liquid crystal display as claimed in claim 1, wherein a portion of a periphery of the base is absent from the reinforced portion so that the base can accommodate the flexible printed circuit.

7. The liquid crystal display as claimed in claim 6, wherein the at least one support is a pillar having any one cross-sectional shape selected from a circle, a triangle, and a rectangle.

8. The liquid crystal display as claimed in claim 1, wherein a height of the at least one support is about equal to a thickness of the reinforced portion.

9. The liquid crystal display as claimed in claim 1, further comprising at least two supports arranged linearly.

10. The liquid crystal display as claimed in claim 1, further comprising at least three supports arranged non-linearly.

11. The liquid crystal display as claimed in claim 10, wherein the flexible printed circuit comprises one through hole for each of the at least three supports, each of the at least three supports protruding through each corresponding through hole.

12. The liquid crystal display as claimed in claim 1, wherein the window is attached to the reinforced portion.

13. A method for manufacturing a liquid crystal display comprising:
    providing a frame having at least one support protruding from the frame in a thickness direction;
    placing an optical sheet within the frame;
    placing a flexible printed circuit on one side of the optical sheet;
    placing a liquid crystal display panel on the optical sheet, the liquid crystal display panel including a large scale integrated circuit; and
    placing a window onto the frame such that the at least one support contacts the window to provide support thereto.

14. The method for manufacturing a liquid crystal display as claimed in claim 13, wherein the at least one support is a pillar having any one cross-sectional shape selected from a circle, a triangle, and a rectangle.

15. The method for manufacturing a liquid crystal display as claimed in claim 13, wherein the at least one support protrudes into a space between the large scale integrated circuit and the window to protect the large scale integrated circuit from an external impact or pressure.

16. The method for manufacturing a liquid crystal display as claimed in claim 13, wherein the at least one support protrudes into a space between the large scale integrated circuit and the window to protect the liquid crystal display panel from an external impact or pressure.

17. The method for manufacturing a liquid crystal display as claimed in claim 13, wherein the flexible printed circuit comprises at least one through hole through which the at least one support protrudes.

18. The method for manufacturing a liquid crystal display as claimed in claim 13, wherein the frame comprises:
    a base, wherein the at least one support extends from the base; and
    a reinforced portion extending from the base, the reinforced portion defining a partial edge of the frame.

19. The method for manufacturing a liquid crystal display as claimed in claim 18, wherein the at least one support is a pillar having any one cross-sectional shape selected from a circle, a triangle, and a rectangle.

20. The method for manufacturing a liquid crystal display as claimed in claim 18, wherein a height of the support is about equal to a thickness of the reinforced portion.

21. The method for manufacturing a liquid crystal display as claimed in claim 18, the frame further comprising at least two supports arranged linearly.

22. The method for manufacturing a liquid crystal display as claimed in claim 18, the frame further comprising at least three supports arranged non-linearly.

23. The method for manufacturing a liquid crystal display as claimed in claim 22, wherein the flexible printed circuit comprises one through hole for each of the at least three supports, each of the at least three supports protruding through one corresponding through hole.

24. The method for manufacturing a liquid crystal display as claimed in claim 18, wherein the window is attached to the reinforced portion.

* * * * *

UNITED STATES PATENT AND TRADEMARK OFFICE
CERTIFICATE OF CORRECTION

| | | |
|---|---|---|
| PATENT NO. | : 8,111,346 B2 | Page 1 of 1 |
| APPLICATION NO. | : 12/121675 | |
| DATED | : February 7, 2012 | |
| INVENTOR(S) | : Jinseok Jang et al. | |

It is certified that error appears in the above-identified patent and that said Letters Patent is hereby corrected as shown below:

On The Title Page

Item (57) Abstract, line 9    Delete "frame at";
Insert -- frame. At --

Signed and Sealed this
Twenty-ninth Day of January, 2013

David J. Kappos
*Director of the United States Patent and Trademark Office*